United States Patent
Gotoh et al.

(10) Patent No.: US 6,749,183 B2
(45) Date of Patent: *Jun. 15, 2004

(54) PRODUCTION METHOD OF ELECTRONIC PARTS AND WATER TREATMENT APPARATUS

(75) Inventors: Masashi Gotoh, Chuo-ku (JP); Jitsuo Kanazawa, Chuo-ku (JP); Syuichiro Yamamoto, Chuo-ku (JP)

(73) Assignee: TDK Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/238,868

(22) Filed: Sep. 11, 2002

(65) Prior Publication Data

US 2003/0006513 A1 Jan. 9, 2003

Related U.S. Application Data

(62) Division of application No. 09/314,117, filed on May 19, 1999, now Pat. No. 6,471,783.

(30) Foreign Application Priority Data

May 20, 1998 (JP) .......................................... 10-155301

(51) Int. Cl.[7] .................................................. B01F 3/04
(52) U.S. Cl. ................................ 261/121.1; 261/122.1; 96/202
(58) Field of Search ........................... 261/121.1, 122.1, 261/124, 126; 96/202; 426/477

(56) References Cited

U.S. PATENT DOCUMENTS

| 4,259,360 | A | * | 3/1981 | Venetucci et al. ............ 426/477 |
| 4,352,682 | A | * | 10/1982 | Kemp, Jr. et al. |
| 4,766,001 | A | * | 8/1988 | Mizandjian et al. ......... 426/477 |
| 4,861,352 | A | * | 8/1989 | Cheng |
| 5,014,727 | A | * | 5/1991 | Aigo ........................ 261/122.1 |
| 5,112,357 | A | * | 5/1992 | Bjerklund et al. |
| 5,766,321 | A | * | 6/1998 | Ishihara et al. ................ 96/202 |

FOREIGN PATENT DOCUMENTS

| JP | 55-153332 | * | 11/1980 |
| JP | 58-7831 | * | 1/1983 |
| JP | 4-40270 | * | 2/1992 |
| JP | 9-307155 | * | 11/1997 |

* cited by examiner

*Primary Examiner*—Scott Bushey
(74) *Attorney, Agent, or Firm*—Oblon, Spivak, McClelland, Maier & Neustadt, P.C.

(57) ABSTRACT

A water treatment apparatus including a mixing bath having an open portion where a carbonic acid gas intermixed with water to be treated by the water treatment apparatus and dissolved oxygen excluded from the water to be treated are discharged. The water treatment apparatus also includes water storage tank separate from the mixing bath and in which treated water from the mixing bath is stored.

4 Claims, 2 Drawing Sheets

PRODUCTION METHOD OF ELECTRONIC PARTS AND WATER TREATMENT APPARATUS

This application is a Division of application Ser. No. 09/314,117, filed May 19, 1999, now U.S. Pat. No. 6,471,783.

DETAILED DESCRIPTION OF THE INVENTION

1. Field of the Invention

The present invention relates to a production method of electronic parts having a step of working a substrate having disposed thereon a metal thin film conductor and also to an apparatus for producing water used in the above-described step.

2. Description of the Related Arts

Hitherto, in the case of working semiconductor substrates, such as, for example, washing, cutting, polishing, and a surface treatment, water is used. However, when water is sprayed onto a substrate at working, there is a problem that a static electricity is generated mainly by the friction between the water and the substrate. That is, in the case of working a substrate having formed thereon electrodes composed of a metal thin-film conductor, it sometime happens that the electrodes are destroyed by the generated static electricity. Recently, because electrodes are fined with small-sizing of electronic parts and increasing of high integration, the possibility of the destruction of the electrodes is more increased. To prevent the occurrence of the destruction of the electrodes by a static electricity, it is proposed to use an electrically conductive liquid such as a carbonic acid gas-intermixed water, etc., in the case of washing an Si wafer with high-pressure water in JP-A-58-7831.

On the other hand, it is known that when in the case of working electronic parts using water, the amount of oxygen dissolved in the water is large, the electronic parts are corroded and oxidized. To prevent the occurrence of such a corrosion and oxidation, it is proposed to use a deoxidation water obtained by vacuum deairing via a deoxidation membrane for washing in JP-A-4-40270. The concentration of oxygen dissolved in the deoxidation water is 1 ppm or lower. Also, in JP-A-55-153332, a method of using water which was at least once boiled in the case of washing gallium arsenide semiconductor devices is proposed. The proposition is to prevent the oxidation of a gallium arsenide substrate.

The above-described propositions are all for the case of using semiconductor substrates but recently, electronic parts using piezoelectric substrates such as a surface acoustic wave (SAW) element, etc., have been increased. In the case of producing these electric parts, water is used at washing or cutting. However, because in a substrate having a pyroelectric property such as a piezoelectric substrate (for example, $LiNbO_3$ and $LiTaO_3$), an electrostatic charge generates even by heat and stress, the amount of electrostatic charge is greatly increased as compared with a semiconductor substrate. Also, in the electronic parts using piezoelectric substrates, in for example, a surface acoustic wave element, the electrode is thin and fine. In such circumstances, in the electronic parts using the piezoelectric substrates, particularly, the surface acoustic element, there is a problem that even when the water having the controlled electric conductivity and dissolved amount of oxygen same as the case of semiconductor substrates is used, the electrostatic destruction of the electrodes cannot be avoided.

Furthermore, in the surface acoustic wave element, to improve the electric power resistance, it is proposed to use two or more kinds of metals (for example, Al and Cu) for the electrodes but because in such an electrode, a local cell is formed by the potential difference between the two or more kinds of metals, the influence of the local cell is increased by the influenced with dissolved oxygen, the corrosion of the electrode is liable to proceed.

Also, in an electronic part wherein an metal thin-film conductor is formed on a semiconductor substrate, a protective film made up of $SiO_2$, etc., is further formed on the metal thin-film conductor and in the case of washing or in the case of obtaining plural elements by cutting the substrate, the corrosion of the metal thin-film conductor is hard to occur because the metal thin-film conductor is in the state of being protected with the protective film. On the other hand, in the surface acoustic wave element, a piezoelectric film is sometimes formed on a metal thin-film conductor but because the metal thin-film conductor is frequently exposed, the resistance to the corrosion is weak.

Then, by illustrating the production of a surface acoustic wave element having a metal thin-film electrode containing Al and Cu, the troubles occurring in the case of working using water are practically explained.

The troubles occurring at working using water are largely the following 1) to 3).

1) Electrode destruction by static electricity (static destruction).

2) Corrosion of electrodes occurring because the pH of water is outside a proper range.

3) Pitting caused by the action of dissolved oxygen in water as an oxidizing agent.

The static destruction of 1) occurs when the specific resistance of water becomes large. Hitherto, the specific resistance of water is lowered by dissolving a carbonic acid gas in pure water but because in the carbonic acid gas dissolving apparatus described in JP-A-58-7831, a carbonic acid gas is intermixed in a bath which is not open to the air, the carbonic acid gas is reluctant to be dissolved in pure water and hence it is difficult to lower the specific resistance of the water.

The corrosion of the electrode of 2) is caused by the dissolution of Al occurring when the pH of water is outside the pH range (generally, from 4 to 8) at which, Al can stably exist in the water.

The pitting of 3) occurs in the pH range (from 4 to 8) at which Al can stably exist in the water. In an Al—Cu electrode used for improving the electric power resistance in the surface acoustic wave element, a passive state ($Al_2O_3$) film exists on the surface of the electrode but when a defect exists in the passive state film, a local cell action occurs between Al and $CuAl_2$ existing in the electrode, whereby Al is dissolved to cause pitting. In the course, dissolved oxygen becomes one of the factors of proceeding the occurrence of pitting. In JP-A-58-7831, the specific resistance of water is lowered by intermixing a carbonic acid gas but because in the carbonic acid gas dissolving apparatus described in the above-described patent publication, the carbonic acid gas is intermixed in a bath which is not opened in the air, the amount of dissolved oxygen in the water cannot be restrained. Thus, it is difficult to use the water produced by the apparatus described in the above-described patent publication for the production of surface acoustic wave elements.

SUMMARY OF THE INVENTION

The present invention has been made under these circumstances. An object of the present invention is to restrain the generations of the static electricity and the oxidation caused by the water used for working in the case of working substrates in the production step of electronic parts.

It has now been found that the above-described object can be attained by the invention shown by (1) to (7) described below.

(1) A production method of an electronic part comprising a step of working a substrate having formed thereon a metal thin-film conductor using water, wherein said water satisfies the following relations;

$3.5 \leq pH \leq 6.5$ $DO \leq 0.5\ pH^2 - 6.5\ pH + 22$

[wherein, DO represents the dissolved oxygen amount (unit ppm)].

(2) A production method of an electronic part of (1) wherein the metal thin-film conductor contains at least two kinds of metals including Al.

(3) A production method of an electronic part of (1) wherein the substrate has a pyroelectric property.

(4) A water treatment apparatus comprising a mixing bath having formed an open portion, wherein the mixing bath is constructed such that a carbonic acid gas is intermixed in water to be treated by being bubbled and dissolved oxygen excluded from the water to be treated with the intermixed carbonic acid gas is discharged from the open portion.

(5) A water treatment apparatus of (4) wherein the apparatus has a water storage tank, the mixing bath has open portions at the upper portion and the lower portion respectively, dissolved oxygen excluded from the water to be treated is discharged from the upper open portion, and the carbonic acid gas-intermixed water to be treated is supplied to the water storage tank from the lower open portion.

(6) A water treatment apparatus of (4) wherein a carbonic acid gas is supplied to the water to be treated in the mixing bath though a porous filter.

(7) A water treatment apparatus of (4) wherein the water used in the production method of an electronic part of (1) is produced.

DETAILED DESCRIPTION OF THE INVENTION

Then, the present invention is described in detail.

The production method of the present invention has a step of working a substrate having formed thereon a metal thin-film conductor using water. The present inventors determined the relation of the pH and the dissolved oxygen amount of water and the inferiority generating ratio about a surface acoustic wave element to restrain the inferiority generation by working using water. The surface acoustic wave element is composed of an $LiNbO_3$ substrate having formed thereon a cross-finger-form electrode (thickness 165 nm, electrode finger width 1 μm) made up of a 0.5% Cu—Al alloy.

Figure 1:
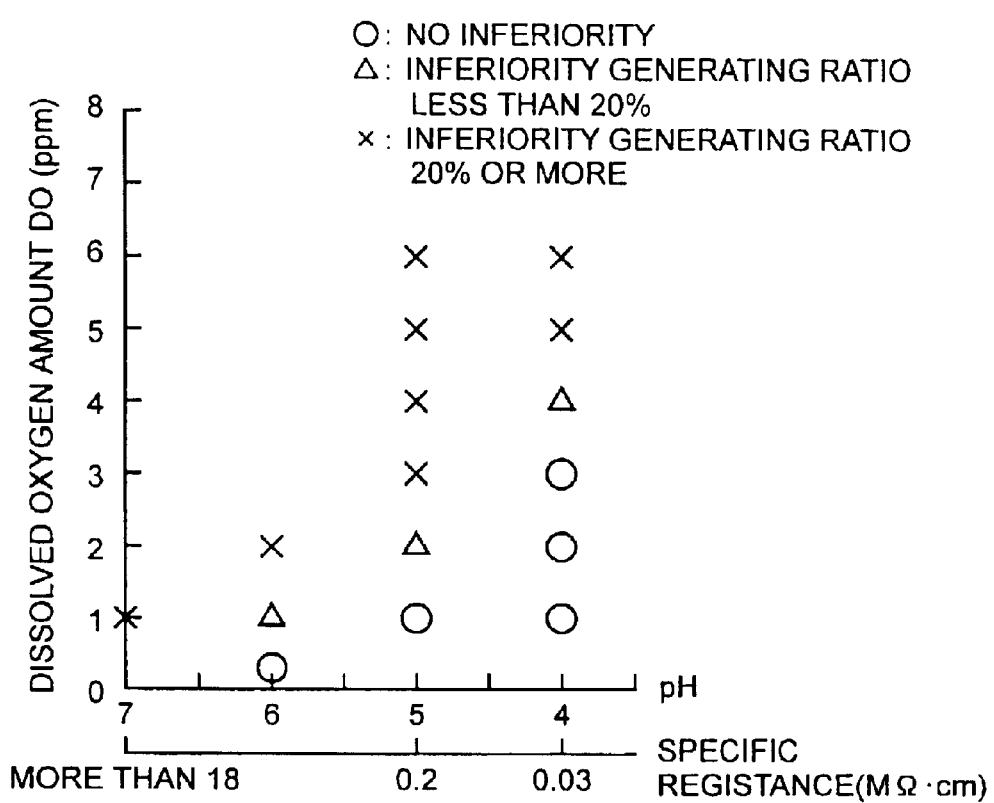
FIG. 1 is a graph showing the relations of the pH, the specific resistance, and the dissolved oxygen amount of water used for working, and the inferiority generating ratio of a surface acoustic wave element to be worked.

FIG. 1 shows the relations of the pH, the specific resistance, and the dissolved oxygen amount (DO) of water, and the inferiority generating ratio of the surface acoustic wave element. In addition, DO in FIG. 1 is a dissolved oxygen amount shown by ppm (mg/liter). As shown in FIG. 1, the specific resistance of water changes according to the pH. The inferiority generating ratio shown in FIG. 1 is the generating ratios of both the static destruction and the corrosion of the above-described electrode. In addition, at the measurement of the inferiority generating ratio, a test of immersing the element in water for 24 hours, a test of exposing the element to running water for maximum 6 hours, and a test of high-pressure water spraying imitating a dicing (cutting) process were carried out.

From the experimental results, the inventors have found that by using water satisfying $3.5 \leq pH \leq 6.5$ and $DO \leq 0.5\ pH^2 - 6.5\ pH + 22$ for working of electronic parts, the inferiority generating ratio can be remarkably restrained. In addition, even when a carbonic acid gas is dissolved in water until the gas is almost saturated, it is difficult to be the pH of the water lower than 3.5.

As is clear from FIG. 1 and the above-described relations, with lowering the pH and the specific resistance of water, the allowable dissolved oxygen amount in the water is increased. This has never hitherto been indicated and has been first clarified by the invention. Accordingly, by applying the present invention, the freedom of the condition establishment in the production process can be increased. For example, because when the dissolved oxygen amount in water is lowered to about 1 ppm, even when the pH of the water is relatively high as 5, the inferiority generating ratio can be almost completely restrained, the present invention is suitable for the case of requiring a relatively high pH of water for prolonging the life of a cutting blade as will be described below. On the other hand, in the case of causing no problem even when the pH of water is 4, when the dissolved oxygen amount is high as 3 ppm, the inferiority generation can be restrained, whereby the cost for removing dissolved oxygen can be restrained. Also, the water wherein the pH is about 4 and the dissolved oxygen amount is 3 ppm or lower is easily obtained by only the water treatment apparatus of this invention described below without need of other treatment. Accordingly, in the present invention, it is preferred to use the water wherein the pH of from 3.6 to 4.2 and the dissolved oxygen amount of 3 ppm or lower.

In addition, as mentioned above, the pH range of water, at which Al used for electrode can stably exist is considered to be 4 or higher but according to the inventors' investigation, it has been found that by applying, for example, annealing to an electrode made up of Al or made up of Al as the main constituent, a strong $Al_2O_3$ film can be formed on the surface thereof and thus the water having a pH of 3.5 or higher but lower than 4 can be used.

Now, to cut an Si wafer, it is general to use a blade formed by binding diamond grinding stone particles with an Ni-base metal binder but when water having a pH of about 4 is used, the Ni-base metal binder is corroded and the life of the blade is greatly shortened. In this case, by increasing the pH of the water to about 5 and also lowering the dissolved oxygen amount, the life of the blade can be prolonged without accompanied by the inferiority generation. In addition, because in a blade using a phenol resin as the binder, the life thereof is not lowered even when the pH of water to 4, it is suitable in the case of requiring a low pH.

The dissolved oxygen amount may be measured by a general method. That is, for example, a commercially available apparatus utilizing a polarographic system oxygen electrode using platinum as the cathode, silver as the anode, and an alkali solution as the electrolyte or a galvanic system electrode using platinum as the anode, lead as the cathode, and an alkali solution as the electrolyte can be used for the measurement. In addition, FIG. 1 shows the result obtained using the polarographic system oxygen electrode. The polarographic system has a feature that the reproducibility is excellent as compared with the galvanic system.

In addition, FIG. 1 is the results about a specific surface acoustic wave element but according to the inventors' experiments, it has been confirmed that when the pH of the water used is in the above-described range and the pH and the DO of the water are in the above-described relation, about all the electronic parts using a substrate having a pyroelectric property, the inferiority generating ratio is similarly greatly reduced.

The present invention can be applied to the productions of various kinds of electronic parts each using a substrate having formed thereon a metal thin-film conductor. The substrate may be one having a pyroelectric property such as a piezoelectric substrate, etc., or a semiconductor substrate but because as described above, in an electronic part wherein a fine metal thin-film conductor pattern is formed on a substrate having a pyroelectric property, an inferiority is liable to occur, the present invention is particularly effective for the production of such electronic parts.

As the metal thin-film conductor of an electronic part to which the production method of the present invention is applied, there may be one made up of Al or one made up of Al and one or more kinds of other metals, and in any case, the effects of this invention are realized. However, as described above, the present invention gives particularly high effects to the electronic parts each having a metal thin-film conductor comprising an alloy or a laminate capable of causing a local cell action. The electrode containing Al and at least one other metal is used for increasing, for example, the electric power resistance in a surface acoustic wave element. Other metals than Al include, for example, Cu, Ti, Pd, Nb, Sc, Ni, Mg, Ge, Si, Co, Zn, Li, Ta, Au, Ag, Pt, Cr, Hf, Zr, Cd, W, and V. The content of other metal(s) than Al is generally not more than 20% by weight. As the metal thin-film conductor containing Al and at least one other metal than Al, there may be not only those of a single layer structure made up of an Al alloy, but also those of a structure of laminating two or more kinds of thin layers each having a different composition and those of a structure of, for example, an Al/Cu laminate or repeatedly laminating the laminate. There is no particular restriction on the thickness of the metal thin-film conductor but in a cross-finger-form electrode, the thickness is usually from about 0.03 to 1.5 nm. Also, the electrode finger width of the cross-finger-form electrode may be properly selected according to the frequency which is applied to the surface acoustic wave element, and, for example, in the frequency band of from 10 to 500 MHz, the width is generally from about 2 to 10 $\mu$m.

There is no particular restriction on the means of making the pH and the dissolved oxygen amount of water the above-described relation in the present invention. For example, a method of lowering the pH by dissolving a carbonic acid gas as in a conventional method can be utilized. However, as described above, in a conventional carbonic acid gas dissolving apparatus, the dissolution is carried out in a bath of a closed system. According to the inventors' experiments, in the case of carrying out the dissolution of a carbonic acid gas in a bath of a closed system, lowering of the dissolved oxygen amount is not obtained. Also, it has been found that in the dissolution of a carbonic acid gas in a bath of a closed system, it is difficult to increase the dissolved amount of a carbonic acid gas. Accordingly, as far as the conventional apparatus is used, it is necessary to carry out a dissolved oxygen amount reducing treatment independent from the dissolution treatment. In this case, for the dissolved oxygen amount reducing treatment, a vacuum removing method, a boiling method, an application of ultrasonic wave, the use of a disoxidant, the use of a disoxidation membrane, etc., may be utilized.

However, when both the dissolution of a carbonic acid gas and the dissolved oxygen reducing treatment are carried out independently, lowering of the productivity and a cost up are accompanied. Thus, in the present invention, the water treatment apparatus of carrying out carbonic acid gas bubbling in a bath of an open system as described below is proposed.

Figure 2:
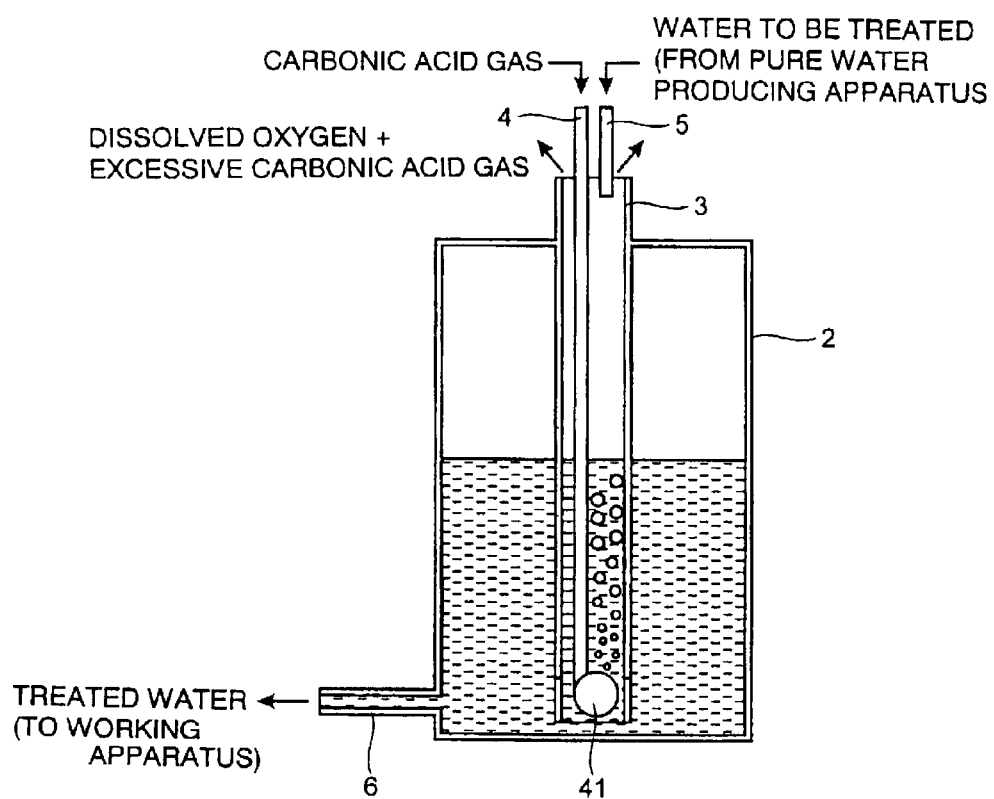
FIG. 2 is a cross-sectional view showing an example of the structure of the water treatment apparatus of the present invention.

An example of the structure of the water treatment apparatus of this invention is shown in FIG. 2 as the cross-sectional view. The water treatment apparatus of this invention has the structure that a cylindrical mixing bath 3 having the open upper end and the open lower end is disposed in a water storage tank 2 by thrusting through the closed upper wall of the storage tank 2. At the upper portion of the mixing bath 3 are formed a carbonic acid gas supplying pipe 4 extending through the inside of the mixing bath 3 into the inside of the water storage tank 2 and a supplying pipe 5 of water to be treated. At the end portion of the carbonic acid gas supplying pipe 4 disposed in the inside of the water storage tank 2 is formed a porous filter 41. The porous filter 41 is a membrane filter made up of a resin film having many pores. The porous filter illustrated in the figure is a hollow body and has a structure that a carbonic acid gas is press-sent in the inside thereof from the carbonic acid gas supplying pipe 4. At the lower portion of the water storage tank 2 is formed a treated water discharging pipe 6 connecting outside. In the water treating apparatus, from a pure water producing apparatus of the outside, water (pure water) to be treated is supplied in the mixing bath 3 through the supplying pipe 5 of water to be treated and in the water storing course, water to be treated is bubbled in the mixing bath 3 with the carbonic acid gas supplied through the porous filter 41 existing near the bottom portion of the mixing bath 3. In this case, the carbonic acid gas is dissolved in the water to be treated to lower the specific resistance thereof and at the same time, dissolved oxygen contained in the water to be treated is excluded by the carbonic acid gas. Also, the excluded dissolved oxygen is discharged together with excessive carbonic acid gas from the open upper portion of the mixing bath 3. The pure water (treated water) of which the specific resistance is lowered and the dissolved oxygen amount is reduced as described above is discharged to the outside the apparatus from the treated water discharging pipe 6 through the water storage tank 2 and is supplied to a working apparatus such as a substrate washing apparatus, a substrate cutting apparatus, etc. In addition, in the construction, because the water storage tank 2 functions as a buffer tank for buffing the difference between the production speed of treated water and the using speed thereof, it is unnecessary to finely control the supplying amount of the water to be treated according to the using amount of the treated water.

One feature of the apparatus is in that by bubbling a carbonic acid gas in an open-type mixing bath, the carbonic acid gas can be replaced with dissolved oxygen in water.

Another feature of the apparatus is to use the porous filter 41 of the above-described construction. By using a hollow-type membrane filter having many pores and bubbling a carbonic acid gas through the pores, the contact areas of the carbonic acid gas and the water to be treated are increased, whereby it becomes possible to dissolve the carbonic acid gas in the water to be treated until the gas is almost saturated in a short time. To such a water treatment apparatus of this invention, in a conventional closed-type carbonic acid dissolving apparatus, the dissolved oxygen amount in water cannot be reduced by the dissolution of a carbonic acid gas and also because in the conventional apparatus, bubbling through the porous filer as described above is not carried out, it is substantially impossible to lower the pH of water to the above-described preferred range (3.6 to 4.2) unless the treatment speed is extremely lowered.

By using the water treatment apparatus of this invention as described above, the treated water having a low specific resistance and a less dissolved oxygen amount as compared with those of the water to be treated can be easily obtained by only carbonic acid gas bubbling. Practically, the treated water having pH of about 4 (specific resistance of 0.03 M$\Omega$·cm) and containing a dissolved oxygen amount of about 3 ppm is easily obtained. Furthermore, the production cost in the apparatus using an open-system bath is greatly low as compared with an apparatus using a closed-system bath. On the other hand, when a conventional closed-system bath is used and the treatment speed is same as that of the water-treatment apparatus of this invention, the pH of the water is lowered only about 5 (the specific resistance of 0.2 M$\Omega$·cm) and the dissolved oxygen amount is about 8 ppm, which is almost same as that in ordinary pure water. To lower the dissolved oxygen amount to the same level as that in the case of using the water treatment apparatus of this invention, it is necessary to independently carry out a dissolved oxygen amount reducing treatment. However, for example, a membrane deaerator using a deoxidation membrane is more expensive than an expensive closed-system water treatment apparatus.

In addition, because the replacement efficiency (replacement speed) of a carbonic acid gas is changed according to various conditions such as the pore diameter of the porous filter 41, the amount of a supplying carbonic acid gas, the pressure thereof, the supplying speed of water to be treated, etc., the combination of these various conditions may be experimentally determined such that the desired pH and dissolved oxygen amount are obtained but the pore diameter (average diameter) of the porous filter 41, which gives particularly large influences, is preferably not larger than 200 $\mu$m, more preferably not larger than 100 $\mu$m, and far more preferably not larger than 50 $\mu$m. By defining the pore diameter to the above-described size, a sufficient replacement efficiency of a carbonic acid gas is obtained. However, because if the pore diameter is too small, a high pressure is required for bubbling, it is preferred that the pore diameter is usually 5 $\mu$m or larger.

Also, the example shown in FIG. 2 is the construction that the upper wall of the water storage tank 2 is closed but even when the upper wall is opened, the influence giving the pH of water is less. However, to prevent falling of impurities and dust into the water storage tank 2, the closed construction as illustrated in FIG. 2 is preferred.

The water treatment apparatus of the present invention is not limited to the construction illustrated in FIG. 2. That is, when the apparatus is a water treatment apparatus equipped with a mixing bath having formed an open portion, wherein by bubbling a carbonic acid gas in the mixing bath, the carbonic acid gas is intermixed in water to be treated and dissolved oxygen excluded from the water to be treated with the intermixed carbonic acid gas is discharged from the above-described open portion, the effect of this invention is realized. Furthermore, when the apparatus is a construction using a mixing bath having open portions at the upper portion and the lower portion respectively, wherein dissolved oxygen excluded from water to be treated is discharged from the above-described upper open portion and the carbonic acid gas-intermixed water to be treated is supplied to a water storage tank from the above-described lower open portion, that is, when a water storage tank as such a buffer tank is formed, the above-described effect is realized. Such a buffer tank is not limited to the construction containing a mixing bath in the inside as shown in FIG. 2 but may be a construction connected to the lower open portion of the mixing bath by a connecting pipe, etc.

When a test of immersing the surface acoustic wave element used in the experiment of which the results were shown in FIG. 1 in the treated water produced by the water treatment apparatus of the present invention was performed, any inferiority was not generated even when the immersion was continued for 24 hours. On the other hand, when the treated water produced by a conventional closed-type water treatment apparatus was used, the corrosion of the electrode occurred by the immersion for one hour.

In the treated water obtained by the water treatment apparatus of the present invention, it is considered that the dissolution of a carbonic acid gas is in an almost saturated state and also the changes of the pH and the dissolved oxygen amount with the passage of time are less. For example, when the treated water is stored for one week at normal temperature and normal pressure, the pH and the dissolved oxygen amount do not substantially change. Accordingly, the water treatment apparatus of this invention is not limited to the construction that the apparatus is used by being incorporated in a part of a working apparatus as illustrated in FIG. 1 but can be used as an independent water treatment apparatus.

In addition, if necessary, the water treatment apparatus of this invention using the open-type bath may be used together with the above-described dissolved oxygen reducing apparatus. Also, when the water treatment apparatus of this invention is used and other gas such as $N_2$ or Ar is bubbled in placed of a part or the whole of a carbonic acid gas, the dissolved oxygen amount only can be effectively reduced without lowering the pH too much or without substantially lowering the pH. This method is effective in the case of requiring the use of a device or a cutting blade, which has a restriction about pH.

As described above, the present invention has the following effects.

In the present invention, because in the case of working substrates each having on the surface thereof a metal thin-film conductor using a water, the water wherein the pH and the dissolved oxygen amount are in a definite relation is used, the occurrence of inferiority is restrained and also the freedom of the establishment in the production process is increased.

The water used for the production method of this invention can be produced by using a conventional closed-type carbonic acid gas dissolution apparatus together with an independent dissolved oxygen amount reducing apparatus but by using the water treatment apparatus of this invention using the open-type mixing bath, the above-described water can be produced at a greatly low cost.

What is claimed is:

1. A water treatment apparatus comprising:
   a mixing bath having an open portion where carbonic acid gas intermixed with water to be treated in the mixing bath and dissolved oxygen excluded from said water to be treated are discharged;
   a water storage tank separate from the mixing bath and exhausted through the mixing bath, and in which treated water from the mixing bath is stored; and
   an upper portion of the water storage tank configured at least partially to store said treated water.

2. A water treatment apparatus of claim 1, wherein the mixing bath has upper and lower open portions such that the dissolved oxygen excluded from the water to be treated is discharged from the upper open portion and the carbonic acid gas-intermixed with the water to be treated is supplied to the water storage tank from the lower open portion.

3. A water treatment apparatus of claim 1, wherein the mixing bath includes a porous filter through which the carbonic acid gas is supplied to the water to be treated.

4. A water treatment apparatus of claim 1, wherein the mixing bath is configured to produce said treated water satisfying the following relations:

$$3.5 \leq pH \leq 6.5$$

$$DO \leq 0.5 \ pH^2 - 6.5 \ pH + 22,$$

where DO represents a dissolved oxygen amount in ppm.

* * * * *